Jan. 27, 1959  A. W. GAUBATZ  2,870,632
HEATED PRESSURE PROBE
Filed April 13, 1953

Inventor
Arthur W. Gaubatz
By Paul Fitzpatrick
Attorneys

United States Patent Office 2,870,632
Patented Jan. 27, 1959

2,870,632

HEATED PRESSURE PROBE

Arthur W. Gaubatz, Indianapolis, Ind., assignor to General Motors Corporation, Detroit, Mich., a corporation of Delaware Application April 13, 1953, Serial No. 348,341

6 Claims. (Cl. 73—212)

My invention relates to pressure probes for aircraft engines and the like and to the heating of such probes to prevent disabling accumulation of ice therein.

In gas turbine aircraft engines, for example, it is common practice to provide a pressure probe in the air inlet of the engine to receive an input of total pressure from the air entering the engine. The probe is connected by a suitable pressure connection to instruments or controls relating to the metering of fuel or otherwise to the operation of the engine. It is important that the proper operation of the probe and the controls connected thereto not be prevented by deposition of ice on the probe. However, a probe, particularly a total pressure probe, mounted in the inlet air stream is particularly susceptible to ice formation.

My invention is directed to a pressure probe installation which is heated by circulation of hot air so that icing will not occur. The principal objects of the invention are to improve the operation of aircraft engines, to provide an improved pressure probe therefor, and to provide a hot air heated probe particularly adapted for installation in the inlets of aircraft engines.

The objects and advantages of the invention will be more fully understood by consideration of the succeeding detailed description of the preferred embodiments thereof.

Referring to the drawings.

Figure 1:
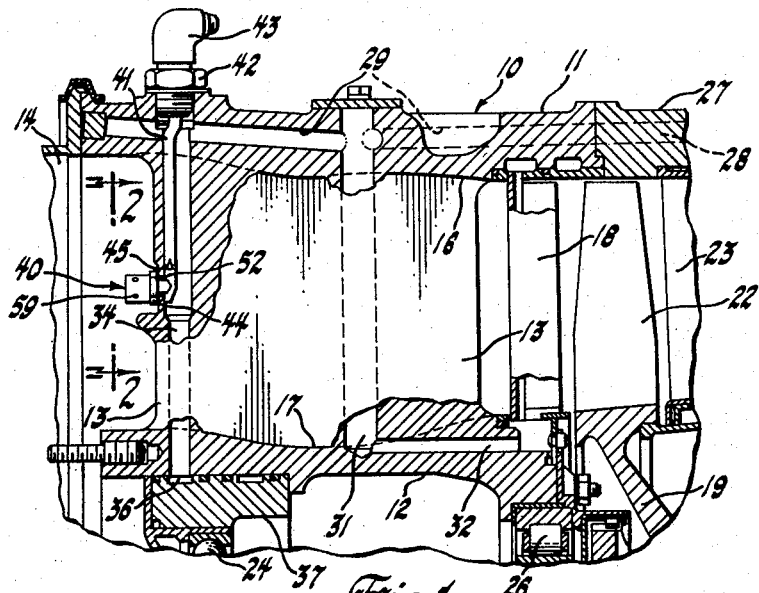
Fig. 1 is a partial sectional view of the inlet section of an aircraft gas turbine engine, this section being taken in a plane containing the axis of the engine.

Fig. 1 shows a part of the air inlet of a gas turbine engine with a probe according to the invention mounted therein. The air inlet is fully described in the copending application of Gaubatz et al., Serial No. 285,169, filed April 30, 1952 (Patent 2,800,273). The structure thereof is described herein to the extent that it is material to an understanding of this invention. The compressor inlet is defined by a body 10, commonly known as a forward frame, which may be a cast body comprising an outer shell 11, an inner shell 12, and struts 13 extending between the shells. Air enters the left-hand end of the frame through a conduit fragmentarily indicated at 14 and passes between the inner and outer shells through the passage defined by the inner surface 16 of the outer shell and the outer surface 17 of the inner shell. An annular row of guide vanes 18 mounted at the discharge end of the inlet imparts swirl to the air entering the compressor, which comprises a wheel 19 on which are mounted blades 22 and successive stages including annular rows of stator vanes 23 between the stages of the rotor.

Bearings 24 and 26, mounted within the forward frame, support the engine shaft (not shown). The forward frame is mounted on the forward end of the compressor casing 27. Hot air is brought from a suitable source, such as a later stage of the compressor, through a passage 28 in the compressor casing and a registering passage 29 in the outer wall of the forward frame. This hot air is circulated from the passage 29 through passages 31 and 32 to the inlet guide vanes 18. Air is also conducted from the passage 29 through a passage 34 in the leading edge of the strut 13 to a chamber 36 in the support 37 for the bearing 24, from which it is circulated through other struts (not shown) in the inlet. The details of the circulation of air through the struts and the guide vanes are explained in the aforementioned Gaubatz et al. application but are unnecessary to an understanding of the present invention which relates to a pressure probe 40 mounted on the leading edge of the strut 13 so as to sense the total pressure of the air entering the compressor inlet.

The pressure probe 40 is connected through a pressure connection tube 41 to a fitting 42 threaded into the outer end of the radial passage 34. The tube 41 is rotatably connected or slip fitted in any suitable manner to the fitting 42 which includes a part 43 threaded for connection to an extension of the pressure connection which may run to a fuel control or other instrument.

Figure 2:
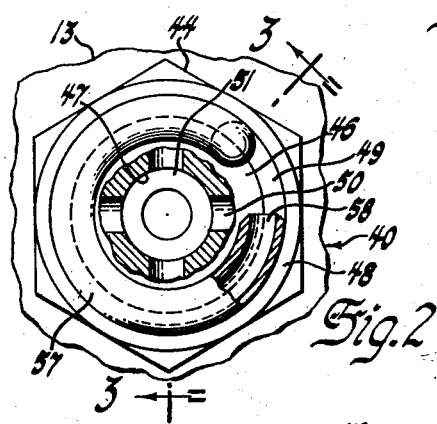
Fig. 2 is a detailed elevational view of the pressure probe taken in the direction indicated in Fig. 1.
Figure 3:
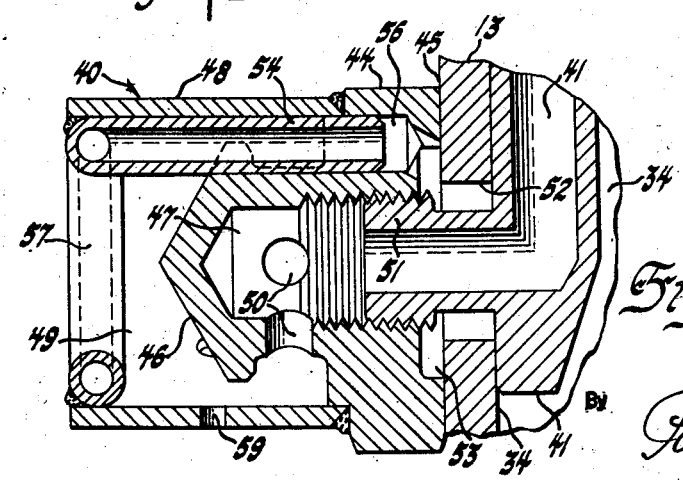
Fig. 3 is a sectional view of the same taken on the plane indicated in Fig. 2.

Referring now to Figs. 2 and 3 for the structure of the probe 40, the probe 40 is an integral body comprised of parts welded or brazed together. The body comprises a hexagonal portion or nut 44, the rearward face of which engages a flattened face portion 45 of the strut 13. A pressure head 46 defining within it a chamber 47 is integral with the nut 44. A cylinder or sleeve 48 brazed to the forward face of the nut 44 defines within it a total pressure chamber 49, this chamber being the space within the sleeve 48 external to the pressure head 46. The head 46 has drilled therein radially extending passages 50 connecting the chamber 49 to the chamber 47. The body portion 44 is internally threaded to receive a nipple 51 extending forwardly from the pressure connection tube 41 through an opening 52 in the forward face of the strut 13 which extends into the passage 34. The nut 44 is recessed to define a hot air receiving chamber 53 in its rear face which receives hot air from the passage 34 through the opening 52, which is not closed by the lower end of the tube 41. A heating tube 54 for the pressure probe is brazed into a socket 56 in the nut 44 which is connected to the chamber 53. The tube 54 extends forwardly parallel to the axis of the probe within chamber 49 to the forward end or pressure inlet thereof where it is bent at right angles and continues in a loop or turn 57 within chamber 49 around the interior of the inlet. The end of the turn 57 is open at 58 to discharge the hot air into the chamber 49.

Drain holes 59, one of which will be in the lower part of the shell 48, are provided to carry away any moisture entering the probe. As will be apparent, the probe may be assembled in the inlet by inserting the pressure connection 41 into the passage 34 and projecting the nipple 51 through the opening 52, then threading the body 40 of the probe onto the nipple. Fitting 42 is then threaded into the body and makes fluid connection with the outer end of the tube 41. Since the pressure connection illustrated is a Pitot tube, the total or ram air pressure is sensed within the chamber 49 from which it is communicated through the openings 50, chamber 47 and connection 41.

Whenever conditions are such that icing of the inlet is possible, hot air under pressure is supplied through the passages 28, 29, and 34 and through the opening 52 and tube 54 to the coil 57. This warm air heats the inlet to the pressure probe and the formation of ice is thus prevented. As will be apparent, the probe takes only a small part of the hot air which is being supplied to the compressor inlet for deicing although, of course, it would be possible to supply air to the probe only if it were not supplied to the struts and other parts of the inlet for deicing.

Figure 4:
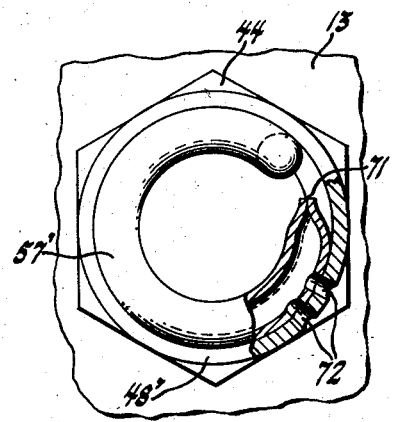
Fig. 4 is a view similar to Fig. 2 of a modified probe.

The probe of Fig. 4 is similar to that previously described except that the forward loop or coil of the heating tube identified as 57' is pinched off or otherwise closed at its end 71 and small holes 72 are drilled through the wall of the tube and the wall of the shell 48' of the probe, so that the heating air is discharged to the outside of the probe. This would eliminate the effect on the pressure reading of the air discharged into the chamber 47 by the heating tube, but this effect would be very slight in gas turbine air intakes.

The description herein of preferred embodiments of the invention for the purpose of illustrating the principles thereof is not to be considered as limiting the invention, since many modifications of the invention within the scope thereof may be devised by the exercise of skill in the art.

I claim:

1. A pressure probe comprising, in combination, means defining a chamber having an inlet open to receive fluid under pressure, means defining an outlet from the chamber for connection to a pressure responsive device, a heating tube formed as a single turn of a coil extending around the said inlet of the chamber and disposed within the chamber, and means for conducting hot fluid to the heating tube, the heating tube having an outlet therefrom for the hot fluid opening into the chamber.

2. In combination, a body comprising a portion exposed to an air stream, the body having an opening in the said portion and defining a passage extending from the opening through the body to a point external to the said portion, a pressure probe mounted on the body and closing the said opening, the pressure probe defining therein a chamber with an entrance exposed to the air stream, means for transmitting pressure extending through the passage and coupled to the probe, means for introducing hot air into the passage, and tubular means within the said chamber communicating with the said passage for circulating the hot air within the probe to deice the probe.

3. In combination, a body comprising a portion exposed to an air stream, the body having an opening in the said portion and defining a passage extending from the opening through the body to a point external to the said portion, a pressure probe mounted on the body and closing the said opening, the pressure probe defining therein a chamber with an entrance exposed to the air stream, means for transmitting pressure extending through and fixed in the passage and mechanically coupled to the probe, the means for transmitting pressure retaining the probe on the body, means for introducing hot air into the passage, and means communicating with the said passage for circulating the hot air within the chamber to deice the probe.

4. A pressure probe comprising, in combination, a generally cup-shaped body having an open entrance at one end for the reception of fluid the pressure of which is to be measured, a pressure head extending into the body centrally thereof from the other end thereof and having openings therein communicating with the interior of the body directed normally to the axis of the body, a pressure connection communicating with the openings extending from the pressure head, means defining a chamber for the reception of heating air around the said pressure connection, and a heating tube connected to the said chamber for circulation of a heated fluid, the said tube being disposed in a loop at the entrance to the body.

5. A pressure probe as defined in claim 4 in which the heating tube discharges into the interior of the body.

6. A pressure probe as defined in claim 4 in which passages are provided for conduction of the heating fluid to the exterior of the body from the heating tube.

References Cited in the file of this patent

UNITED STATES PATENTS

| 2,163,518 | Postlethwaite | June 20, 1939 |
| 2,179,500 | Diehl | Nov. 14, 1939 |
| 2,338,574 | Cunningham | Jan. 4, 1944 |
| 2,356,845 | Hines | Aug. 29, 1944 |
| 2,482,701 | Anderson | Sept. 20, 1949 |
| 2,627,749 | Li | Feb. 10, 1953 |
| 2,641,105 | Drake | June 9, 1953 |
| 2,706,408 | Holbrook | Apr. 19, 1955 |
| 2,740,295 | Perchonok | Apr. 3, 1956 |

FOREIGN PATENTS

| 537,238 | Great Britain | June 13, 1941 |
| 979,504 | France | Dec. 13, 1950 |